(No Model.)
H. E. DEY.
CUT-OUT FOR SECONDARY BATTERIES.
No. 418,702. Patented Jan. 7, 1890.
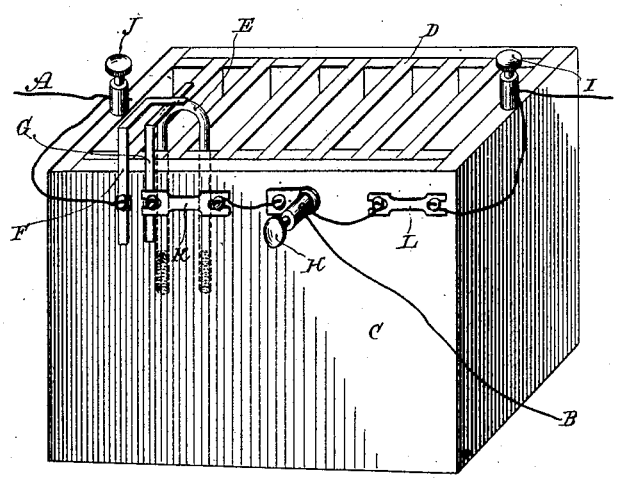
Witnesses:
Caroline E. Davidson
Robt. F. Gaylord
Inventor
Harry E. Dey
By
Duncan, Curtis & Page,
Attorneys.

UNITED STATES PATENT OFFICE.

HARRY E. DEY, OF NEW YORK, N. Y., ASSIGNOR TO PHOEBUS H. ALEXANDER, OF HYDE PARK, MASSACHUSETTS.

CUT-OUT FOR SECONDARY BATTERIES.

SPECIFICATION forming part of Letters Patent No. 418,702, dated January 7, 1890.

Application filed August 22, 1889. Serial No. 321,635. (No model.)

*To all whom it may concern:*

Be it known that I, HARRY E. DEY, a citizen of the United States, residing at New York, in the county and State of New York, have invented certain new and useful Improvements in Cut-Outs for Secondary Batteries, of which the following is a specification.

It is well known that when a secondary battery has been acted upon by a current for a certain time it becomes what is known as "charged," after which the further action of the current results merely in the evolution of gas from the solution. At such time, therefore, or whenever, through any abnormal conditions, gas is given off, it is desirable to cut out the battery from the circuit. Various devices have been proposed for this purpose. Among such devices are several which are brought into operation by the direct instrumentality of the gas itself, and my present invention is an improvement in this particular class of apparatus.

My invention consists in the combination, with devices capable of arresting the charging or action of the battery as by closing a circuit, either directly or indirectly, and thereby disconnecting the battery from its charging or working circuit, of a receptacle or body containing a fluid which is capable of being displaced by the gas evolved from the solution of the battery, so that the body will rise and operate the cut-out devices. The simplest form of apparatus which I have contrived for this purpose is a simple U-shaped glass tube, which I fill with any suitable fluid—such as the solution used in the battery-cell—and support it with its open ends extending downward into the solution of the battery. Above this tube I arrange any suitable form of device, which, being encountered by an upward movement of the tube, will operate to cut out the battery. With a device of this kind when a certain amount of gas passes up into the tube, displacing the liquid therein, the tube rises and operates the cut-out.

In the accompanying drawing I have shown my invention as applied to a secondary-battery cell, the figure being a perspective view of the same.

C is a containing jar or cell in which are arranged a given number of electrodes or plates D. The battery which I prefer is constructed substantially as shown in my patent of July 9, 1889, No. 406,822; but any other form may be employed.

A and B designate the conductors of the charging or working circuit of the battery. Between the binding-post H, to which wire B is connected, and the battery-terminal I, electrically connected therewith, is a fusible strip L. The opposite terminal J is connected to a metallic strip F, attached to the side of the battery-cell and bent over another strip G, also secured to the cell and connected to post H through a safety-strip K.

E is a U-shaped glass tube, which is to be filled with any desired liquid, preferably the same as is used for the battery solution, and is hung over the edge of one of the plates D with its open ends extending down into the solution of the battery. As long as the tube E is filled with liquid it has no tendency to rise; but if gas is evolved from the battery solution some of the ascending bubbles enter the open ends of the tube, displacing the liquid therein. This causes the tube to rise, and at a predetermined point it encounters the flexible strip G, which is normally out of contact with the strip F, and raises it until it touches the said strip F. The battery by this means is short-circuited, and the safety-strips K L, of which the latter is made more sensitive than the former, are at once fused, thus interrupting the charging-circuit and that through the battery.

The devices employed in connection with the tube or body E for cutting out the battery or for interrupting the charging or working circuit may be very greatly varied, and any of the well-known devices may be employed for this purpose, provided they are capable of being operated directly or indirectly by the movement of the said tube E.

The special devices shown are merely given in illustration of the principle of the operation.

The movement of the tube E may be employed not only for effecting in the manner set forth the disconnection of the battery from the circuit, but it may be used for indicating directly or indirectly by any suitable means when the battery is charged.

What I claim is—

1. The combination, with a secondary battery, of a body or receptacle containing a liquid and supported in the solution in such position that the liquid therein will be displaced by gas evolved from the solution, and a cut-out device adapted to be operated by the movement of said body due to the displacement of liquid by the ascending gas, as set forth.

2. The combination, with a secondary battery, of a receptacle containing liquid, open at one end and supported in an inverted position in the battery solution, and a cut-out device in position to be encountered and adapted to be operated by the said receptacle when movement is imparted thereto by the displacement of the liquid by gas evolved from the solution, as set forth.

3. The combination, with a secondary battery, of a U-shaped tube filled with liquid and supported in an inverted position in the solution, and contact terminals of a cut-out device in position to be brought into engagement by an upward movement of the tube, due to the displacement of liquid therefrom by gas evolved from the solution, as set forth.

In testimony whereof I have hereunto subscribed my name this 15th day of August, A. D. 1889.

HARRY E. DEY.

Witnesses:
PARKER W. PAGE,
CAROLINE E. DAVIDSON.